(12) United States Patent
Dumm

(10) Patent No.: US 8,336,495 B1
(45) Date of Patent: Dec. 25, 2012

(54) FLEXIBLE HEAT TREATMENT AND STORAGE BAG

(76) Inventor: Richard H. Dumm, Windsor, CO (US)

( * ) Notice: Subject to any disclaimer, the term of this patent is extended or adjusted under 35 U.S.C. 154(b) by 458 days.

(21) Appl. No.: 12/584,552

(22) Filed: Sep. 8, 2009

(51) Int. Cl.
*A01K 9/00* (2006.01)
(52) U.S. Cl. .................................................. 119/71
(58) Field of Classification Search ............ 119/71, 119/72; 222/105, 92, 10; 383/103, 109; 206/524.1, 524.2, 524.3, 524.6
See application file for complete search history.

(56) References Cited

U.S. PATENT DOCUMENTS

| | | | |
|---|---|---|---|
| 1,596,355 A | 8/1926 | Hirsch | |
| 1,623,107 A | 5/1927 | Goodykoontz | |
| 2,190,420 A | 2/1940 | Frederick et al. | |
| 2,280,410 A | 4/1942 | Keltner | |
| 2,329,347 A | 9/1943 | Graham | |
| 2,697,531 A | 12/1954 | Hood | |
| 2,708,421 A | 5/1955 | Jauch | |
| 2,748,047 A | 5/1956 | Kuss | |
| 2,939,598 A | 6/1960 | Donleavy | |
| 3,663,239 A * | 5/1972 | Rowe et al. | 426/113 |
| 3,873,735 A * | 3/1975 | Chalin et al. | 426/87 |
| 3,874,342 A * | 4/1975 | Kloss | 119/71 |
| 4,445,550 A * | 5/1984 | Davis et al. | 141/329 |
| 4,911,562 A | 3/1990 | Mazzeschi | |
| 5,378,065 A | 1/1995 | Tobolka | |
| 5,558,438 A | 9/1996 | Warr | |
| D376,876 S | 12/1996 | McInnes | |
| 5,749,493 A * | 5/1998 | Boone et al. | 222/105 |
| 5,915,596 A * | 6/1999 | Credle, Jr. | 222/105 |
| 5,941,421 A * | 8/1999 | Overman et al. | 222/105 |
| 6,102,252 A * | 8/2000 | Overman et al. | 222/105 |
| 6,273,307 B1 * | 8/2001 | Gross et al. | 222/566 |
| 6,348,246 B1 * | 2/2002 | Finestone et al. | 428/34.3 |
| 6,374,773 B1 * | 4/2002 | McIntyre et al. | 119/72 |
| RE39,520 E * | 3/2007 | Hess et al. | 222/92 |
| 7,360,501 B2 * | 4/2008 | Jacobsen | 119/72 |
| 7,722,254 B2 * | 5/2010 | Murray | 383/38 |
| 7,754,257 B2 * | 7/2010 | Matsumoto et al. | 426/115 |
| 7,972,064 B2 * | 7/2011 | Anderson | 383/103 |
| 8,056,508 B1 * | 11/2011 | Bryan et al. | 119/71 |
| 8,056,510 B2 * | 11/2011 | Handley et al. | 119/72 |
| 8,070,016 B2 * | 12/2011 | Kawakami et al. | 222/107 |
| 2002/0102032 A1 | 8/2002 | Sturgis et al. | |
| 2004/0096127 A1 | 5/2004 | Rosen | |
| 2005/0031230 A1 | 2/2005 | Ernst et al. | |
| 2009/0028470 A1 * | 1/2009 | Murray | 383/80 |
| 2011/0151069 A1 * | 6/2011 | Harding | 426/117 |

OTHER PUBLICATIONS

U.S. Appl. No. 12/584,551.

* cited by examiner

*Primary Examiner* — Yvonne Abbott
(74) *Attorney, Agent, or Firm* — Albert Haegele; Leyendecker & Lemire, LLC

(57) ABSTRACT

Flexible, collapsible, liquid-tight containers are described. The containers are formed of heat-conductive sheet material and having a pouring or dispensing spout with closure for same. The sheet material is preferably a laminate having at least three layers, including a central, heat-conductive layer, an outer layer of a polymer resistant to physical damage and an inner layer of a thermoplastic polymer which can be fused to another inner layer to seal the edges of the bag. Dispensing fixtures such as a nipple assembly and an esophageal feeder are described, and can be used in feeding calves and other young animals. Processes of heat treating liquids in the containers, including the pasteurizing of dairy products, are described.

2 Claims, 15 Drawing Sheets

FLEXIBLE HEAT TREATMENT AND STORAGE BAG

REFERENCE TO RELATED APPLICATIONS

This application is related to Applicant's prior U.S. Pat. Nos. 6,276,264 (PORTABLE BATCH PASTEURIZER) and 7,401,546 (BATCH PASTEURIZER), although not claiming priority from either, which are both incorporated by reference herein in their entireties. This application is also related (without claiming priority therefrom) to Applicant's application U.S. Ser. No. 11/519,758 for a HEAT EXCHANGER UNIT, published as US 2008/0063771 and now abandoned, which is also incorporated by reference herein in its entirety.

A final related copending application, filed simultaneously with the present application, is Applicant's RHD-5 for a NIPPLE ASSEMBLY.

BACKGROUND OF THE INVENTION

1. Field of the Invention

The embodiments disclosed herein pertain to containers for containing and dispensing liquids, and to heat treatment of liquids so contained.

2. Description of the Relevant Art

Applicant's U.S. Pat. No. 6,276,264 discloses a portable batch pasteurizer well suited for dairy applications and discusses as background various apparatus and techniques used for the heat treatment or pasteurization of liquids, slurries and the like which are intended for consumption as food.

Applicant's U.S. Pat. No. 7,401,756 discloses a batch pasteurizer comprising inner drums to contain a processed liquid, an outer drum surrounding same and providing an annular space for retaining a heating fluid, a helical coil to carry cooling fluid through the heating fluid, means to agitate the treated liquid to optimize heat transfer, and a control system to actuate and control the steps of heating, treating and cooling a processed liquid.

Applicant's application U.S. Ser. No. 11/519,758 discloses a flexible heat exchange jacket which has channels for the flow of a heat exchange fluid along one side, with inlets and outlets attached to a source of heat exchange fluid. The jacket can be attached in a watertight manner around the circumference of a cylindrical process container containing a liquid for heat treatment. A dairy pasteurizer version is disclosed.

Prior art patents disclose numerous containers and systems for storing, handling and dispensing liquids such as dairy products, particularly systems for feeding calves and other young animals.

For example, U.S. Pat. No. 2,190,420 discloses a calf feeder with a nipple, hanger and check valve, made of rubberized canvas.

U.S. Pat. No. 2,329,347 discloses a calf feeder with a hanger and nipple, made of sheet rubber.

U.S. Pat. No. 2,708,421 discloses a collapsible dispensing/feeding device made of waterproof fabric, rubber, etc., having a nipple and a funnel-type filler.

U.S. Pat. No. 2,280,410 discloses a collapsible nursing bag for calves or other young animals, having multiple teats with anti-leak valves and made of sheet rubber.

U.S. Pat. No. 2,748,047 discloses collapsible bags made of flexible plastic which can be used as nursing bags or for carrying/storage. The emphasis in the disclosure is on "reinforced walls of holes in plastic" for constructing the bags.

U.S. Pat. No. 2,697,531 discloses a collapsible infant nursing bottle pre-filled with milk solids and heated after sealing to sterilize the contents. The unit is made of flexible heat-sealed plastic. U.S. Pat. No. 2,939,598 discloses a collapsible nursing bag for infants made of plastic which is heat-sealed and fitted with a nipple. The bag is constructed so that it can stand upright when filled.

U.S. Pat. No. 1,623,107 discloses a collapsible, disposable paper gasoline receptacle with a spout and handle, designed to stand upright when filled. U.S. Pat. No. 4,911,562 discloses a collapsible dispensing can for gasoline or other liquids. The can is formed of flexible plastic material, which can be food grade.

U.S. Pat. No. 5,378,065 discloses a flexible, collapsible container made of a single sheet of plastic material which is folded and bonded together to form the container, including an integral spout. The plastic material can be single or multi-layer, and extruded or co-extruded. Folded portions of he material form a "gusseted" base which can permit a filled container to stand up vertically.

U.S. published application No. 2004/0096127 discloses a flexible container for liquids with an integral handle and self-sealing spout. The material is plastic such as a polyolefin, preferably containing a filler such as chalk. The container is designed to stand upright when filled.

U.S. published application No. 2005/0031230 discloses a self-standing, collapsible container for various liquids made of sheet plastic with heat-sealed edges. A spout with a closure is provided.

U.S. Pat. No. 1,596,355 discloses a conventional canvas water bag with handle and a closure which is the subject of the patent.

U.S. Pat. No. 5,558,438 discloses a bag with a handle and resealable pouring spout made of sheet plastic or fabric, designed for carrying and dispensing dry particulate materials. The sheet material can have multiple layers of the same or different materials, but there is no mention of foil materials or heat conduction.

U.S. published application No. 2002/0102032 discloses a collapsible bag with a handle and pouring spout, made of sheet plastic heat sealed at the edges. The bag is designed to store pourable products.

Even though a variety of containers for the storage and dispensing of liquids and slurries, including the feeding of dairy products to young animals, have been patented and produced, numerous problems remain to be solved and improvements are needed in the field. As stated in Applicant's previous patents, significant improvements in the health of young animals such as calves can be achieved by ensuring that any waste milk, colostrum or other dairy products are pasteurized prior to feeding. However, pasteurizing such products may be insufficient; for example, if a product is pasteurized and then transferred via unsanitary means it will be recontaminated with pathogenic microbes, or if a calf is able to remove the nipple from a feeding container while suckling, the contents will be wasted and/or contaminated. With conventional processing, small quantities of dairy products may be kept in non-refrigerated conditions awaiting adequate volumes to accumulate for a batch to be pasteurized; such problems could be eliminated by collecting the product in small, sealed containers for prompt pasteurization or cooling. Also, since most containers are difficult to clean thoroughly after containing dairy products, it would be desirable to have sanitary, convenient containers which can be configured for one-time use in storing and feeding such products.

In harvesting colostrum or other milk products which are to be fed to calves in a dairy, using milking machines or other means, it has been customary to transfer these products to thick plastic calf milk bottles which are then refrigerated or frozen, but the insulating properties of such bottles make it difficult to achieve fast cooling, and the products must subsequently be transferred to some type of feeder container, as described in some of the patents cited above. Furthermore, the insulating properties of such bottles make it difficult to heat the products for feeding readily and uniformly. This is particularly important for products such as colostrum, as excessively high temperatures can damage the antibodies contained in the product.

It would be desirable to have a container which is flexible and heat conductive enough to permit efficient pasteurization of the products, refrigeration, storage and feeding, all using the same container.

SUMMARY

One aspect of the disclosed embodiments is flexible containers for containing liquids, and a related aspect is that such containers can be collapsed for storage when not containing liquids. Another aspect is forming such containers of heat conductive, flexible materials based upon metal foils such as aluminum foil, which can be coated on at least one side with polymeric materials. If such materials are used for the inner surfaces of containers intended for use with foodstuffs, they should be selected from materials which are considered safe for contact with foods or liquids for consumption by man or beast. Another aspect is the use of such containers for storing, transporting and dispensing liquids through spouts or other transfer devices. Another aspect is the use of such containers for the heat treatment of liquids contained therein, by immersion in heat transfer liquids which can be heated to predetermined temperatures for predetermined times, after which the containers can be removed from the heated liquids, and/or the heated liquids cooled to predetermined temperatures. The flexible nature of the containers permits them to be easily agitated during such treatments by mechanical means or the natural or mechanically induced circulation of the heated heat transfer liquids to provide mixing of the liquids under treatment. Another aspect of the disclosed embodiments is processes for the heat treatment or pasteurization of liquids such as dairy products. A further aspect is the use of the disclosed containers for feeding dairy products or other liquids, which may be pasteurized, to young animals such as calves using fixtures such as nipples and feeding tubes.

One embodiment provides a flexible, collapsible, liquid-tight container formed of heat-conductive sheet material and having pouring or dispensing spout means with closure means for same. The sheet material can comprise at least three laminated layers including a flexible heat conductive layer bonded to at least one flexible polymer layer on each side hereof. The central heat conductive layer can be a metal foil such as aluminum foil, and the inner polymer layer can be a thermoplastic polymer which is acceptable for contact with foodstuffs and suitable for thermal bonding to a layer of the same material. The outer layer can be a flexible polymer which is resistant to physical punctures and tears. In a preferred embodiment, the outer polymer layer can be polyethylene terephthalate and the inner layer a polyethylene, with both materials selected to be resistant to the temperatures intended for use in heat treating the contents of the container in a heat treating process. The inner layers of polyethylene or other thermoplastic polymer are used to thermally bond the edges of the container together.

The spout can preferably comprise a round tube with external threads adapted to receive a screw cap or threaded dispensing fixtures, the tube being thermally bonded into one upper corner of the container between the inner surfaces of the sheet material forming the container. Various useful fixtures can be attached to the spout, including specialized pouring means, nipple assemblies, esophageal feeders, filtering means and pressure control means. One embodiment is a nipple assembly comprising a nipple and a threaded nipple adapter. A second embodiment is an esophageal feeder with a threaded barb fitting for attachment to the threaded spout.

At least one handle or grip should be provided for carrying or suspending the container, preferably on the upper and lower corners of the container opposite the spout. The upper handle can be used for handling the containers and for suspending them, e.g. within a heat transfer liquid for heat treatment. By using both upper and lower handles, the container can be conveniently tipped for dispensing or feeding the liquid within. For economy of production, the container is preferably formed from a pattern cut from a single sheet of laminated sheet material having a thermoplastic polymer on one side which can be used to thermally bond the edges together to form a liquid-tight container. For convenience, the pattern can be cut, folded and bonded together at the edges to form a foldable bottom portion of the container comprising a portion of sheet material folded within the lower portions of the sides of the container, permitting the container to stand upright on a flat surface when containing a portion of liquid.

Various embodiments of the containers described above can be used in processes for heat treating liquids and/or slurries, comprising steps of a) placing a portion of the liquid or slurry in at least one such container, b) immersing the container(s) in a heat transfer liquid, c) heating the heat transfer liquid to at least one predetermined temperature for a predetermined time to produce a predetermined heat treatment profile for the treated liquid, and d) then cooling the heat transfer liquid and/or removing the container(s) from the heat transfer liquid to reduce the temperature of the treated liquid or slurry to a predetermined value.

Any suitable apparatus capable of cycling a heat treatment liquid such as water through a suitable temperature-time profile can be used for such processes, but the pasteurization apparatus disclosed in Applicant's previous patents and a pending application are highly suitable. The containers can be immersed and suspended within the liquid by any suitable mechanical means such as brackets, hooks or the like, and will be subjected to movement by the natural fluid currents generated within such apparatus. Alternatively, or in addition to such natural movement, the containers can be mounted upon mechanical suspension means which subject them to suitable movement to ensure mixing and even heat transfer within the treated liquid during the treatment process. The containers of dairy products or other liquids can be refrigerated or frozen afer heat treatment, and due to their configuration and flexibility can be conveniently stacked atop each other in the refrigerator or other storage unit.

A further embodiment provides a method or process of feeding a young animal with a dairy product pasteurized using a process described above, comprising steps of placing a quantity of at least one dairy product in at least one container as described above, pasteurizing the product(s) by immersion in a heat transfer liquid in apparatus which subjects the heat transfer liquid to a temperature-time profile which provides a pasteurization profile for the product(s), cooling the product(s) to suitable feeding temperature(s) and/or heating them to suitable feeding temperature(s) after cold storage, applying a nipple assembly or esophageal feeder to the spout of the container, tipping it at a suitable angle and inserting the nipple or feeder into the animal's mouth. The filled bags can be defrosted and/or heated to suitable feeding temperatures by immersion in any convenient source of heated liquid for which the temperature can be monitored. The nipples to be used are designed for efficient suckling by the animals to be fed, but in some cases pressure can be exerted on the container to induce flow through an oral or esophageal feeder.

BRIEF DESCRIPTION OF THE DRAWINGS

A more complete appreciation of the disclosed embodiments and many of the aspects and advantages thereof will be readily obtained by perusal of the following detailed description and appended claims in combination with the accompanying drawings, with the same parts being designated by the same numerals in the several views, wherein:

DETAILED DESCRIPTION OF PREFERRED EMBODIMENTS

Although a preferred embodiment has been designed for pasteurizing milk and other dairy products on dairy farms and the like, as well as storing and dispensing same, and the invention will be discussed in that context, systems within the scope of the invention can be used for the processing or heat treatment of all sorts of liquid materials. The fluids will normally be liquids of low to moderate viscosity such as milk, but can also be more viscous dairy products such as colostrum, cream, dairy beverages, ice cream mix or cheeses. Slurry materials such as curds and whey, soups and other feeds and foodstuffs can also be processed using the apparatus and methods disclosed herein. If appropriate, the dry solids alone can be packaged in the bag and water or other liquids added before heat treatment, as with soups and hot beverages.

Naturally, the characteristics of the materials to be treated must be studied and understood before effective heat treatment can begin. For example, it is necessary for each product to determine the appropriate temperature-time cycles for optimum treatment, and to calibrate the temperature-time cycles of the heat treatment liquid which will produce the desired heat treatment profile in the product within the container. This can be done, e.g., by measuring the temperatures attained by the liquid contents of the container during a given temperature-time profile of the heat transfer liquid in a given apparatus and adjusting the temperature-time cycle of the apparatus to provide the required values for the desired heat treatment process. Temperatures of the liquids inside the containers can be measured by installing a temporary sensor such as a thermometer or thermocouple. Commercial thermometers are available (for monitoring he cooking of meats, etc.) which utilize a small sensor inserted in the heated item and can electronically transmit current temperatures to a remote reader. Temperatures and time cycles can be critical for pasteurizing dairy products such as colostrum, as discussed in Applicant's previous patents.

Since the containers disclosed herein are designed to have walls which are highly heat conductive, there should normally be little time lag between the attainment of an equilibrium temperature in a heat transfer liquid and that of the liquid within the container.

Many details of the heat treatment of dairy products and the like are disclosed in Applicant's previous patents, particularly in U.S. Pat. No. 7,401,756. In the present application, the contraction "and/or" is used in the conventional sense, with "A and/or B" meaning that A, B or A+B may be present.

Figure 1:
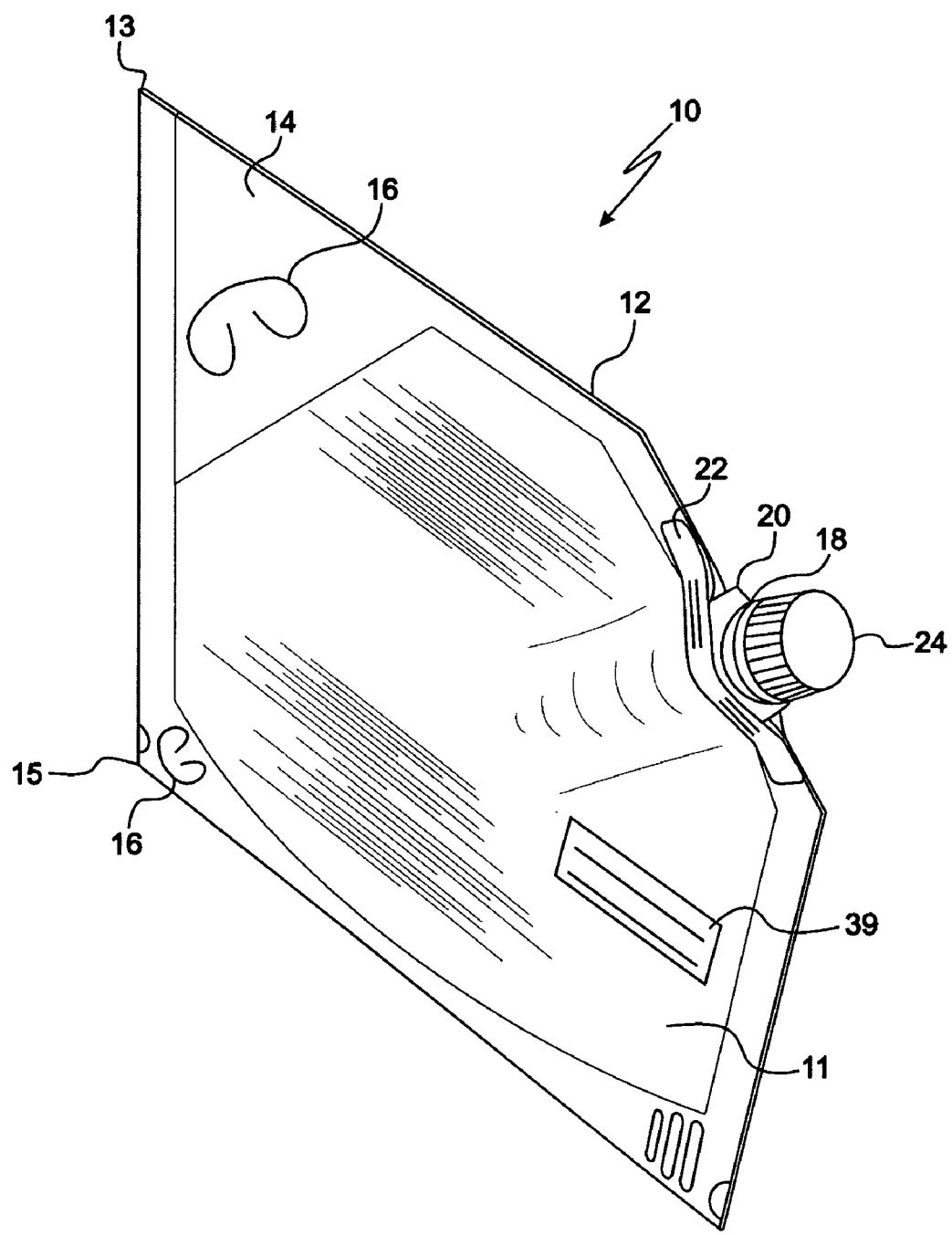
FIG. 1 is a top perspective view of an empty storage/heat treatment bag.

Turning now to the drawings, FIG. 1 illustrates a generally rectangular flexible container for the storage, heat treating and dispensing of liquids, in this case a bag 10 made of a flexible, heat-conductive laminated sheet material 11. Handholds or cutout handles 16 are provided at the top corner 13 of a heat treated flat portion 14 of the bag opposite the spout (not seen here), and optionally on the lower corner 15 opposite the spout as well. These handholds can be formed by simply punching or cutting out suitable patterns in the heat sealed flat portions of the bag, but any suitable handle means can be provided, and the portions of the bag where they are installed can be reinforced to ensure their ability to support the weight of a full bag. The edges 12 of the bag are heat sealed, as are larger portions of the bag such as flat areas 14 where the handholds are placed.

At least one writable panel or label section 39 is provided for recording data or other information about the contents of the bag, etc. The writable portion can be an integral portion of the outer surface layer of the sheet material, or a durable layer or label of material applied thereto, as long as they are resistant to moisture and heat. Preferably, the writable portion has a matte finish similar to that used on the writable portions of the reclosable plastic bags used for food storage. The bags can be designed with a portion of at least one side having writable surfaces for recording such information as dates, contents, product quality and the like. These areas also offer a place for company logos and additional art work which can make heat treatment recommendations, and provide feeding instructions, warnings about the use of the bags, etc.

Figure 4:
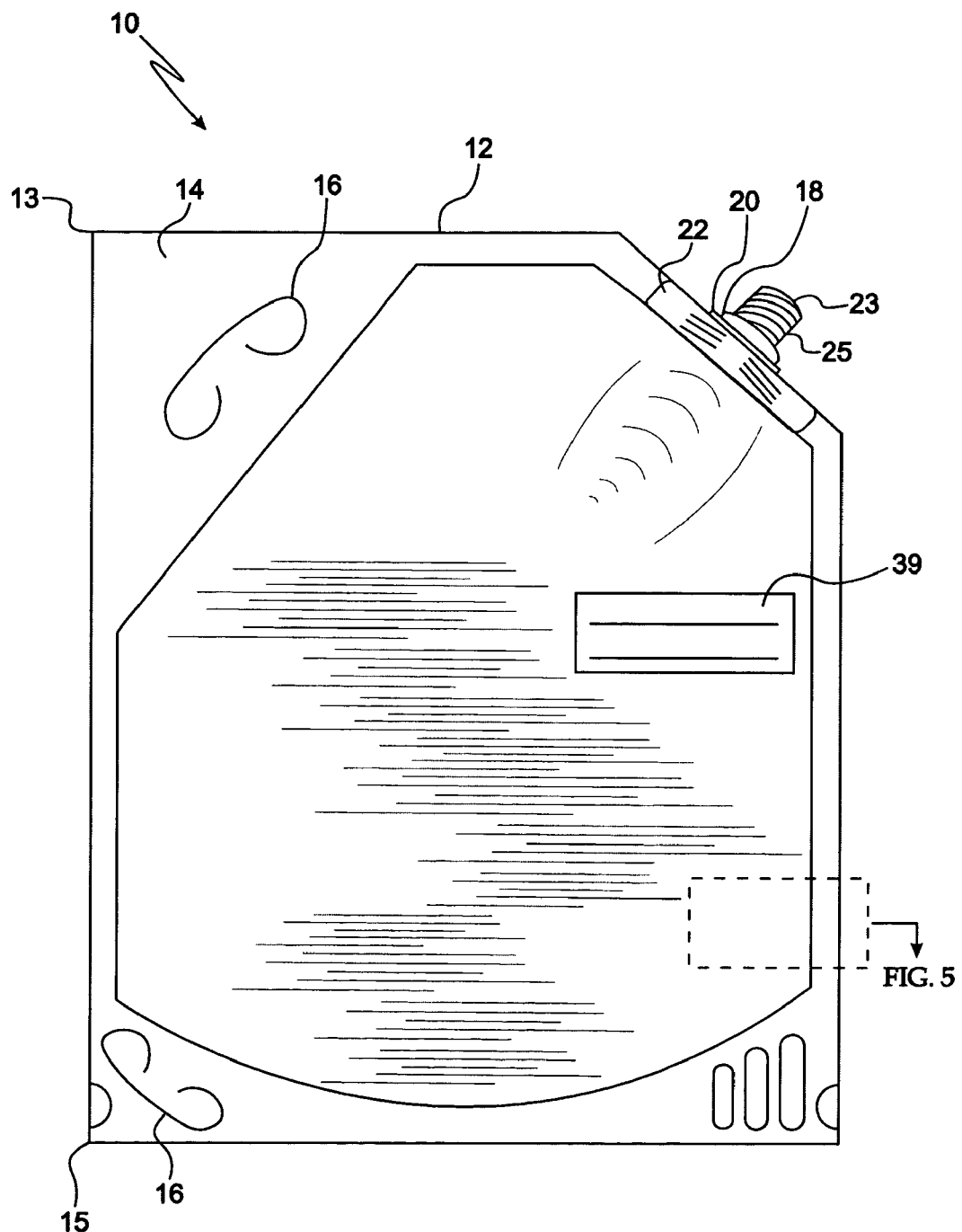
FIG. 4 is an orthogonal front view of the bag of FIG. 1.

FIG. 4 shows an orthogonal side view of the bag of FIG. 1 with writable panel 39. As shown in more detail in FIGS. 6A and 6B, base 20 of the spout assembly is heat sealed into position by inner portions 22 of the sheet material 11, and spout 23 has male threads 25 (shown in FIG. 4). Screw cap 24 (shown in FIGS. 1 and 2) or a similar closure can be applied to the spout 23 to retain the contents. FIG. 4 shows an empty bag with screw cap 24 removed to show threads 25 on spout 23. The base of the spout 18 is visible adjacent to the base 20 of the spout assembly. The spout is preferably positioned parallel to the plane of the empty bag and describing acute angles with respect to the top and side edges of the bag, preferably about 45 degrees as shown, to facilitate the use of the bag in feeding young animals or dispensing liquid products.

Figure 2:
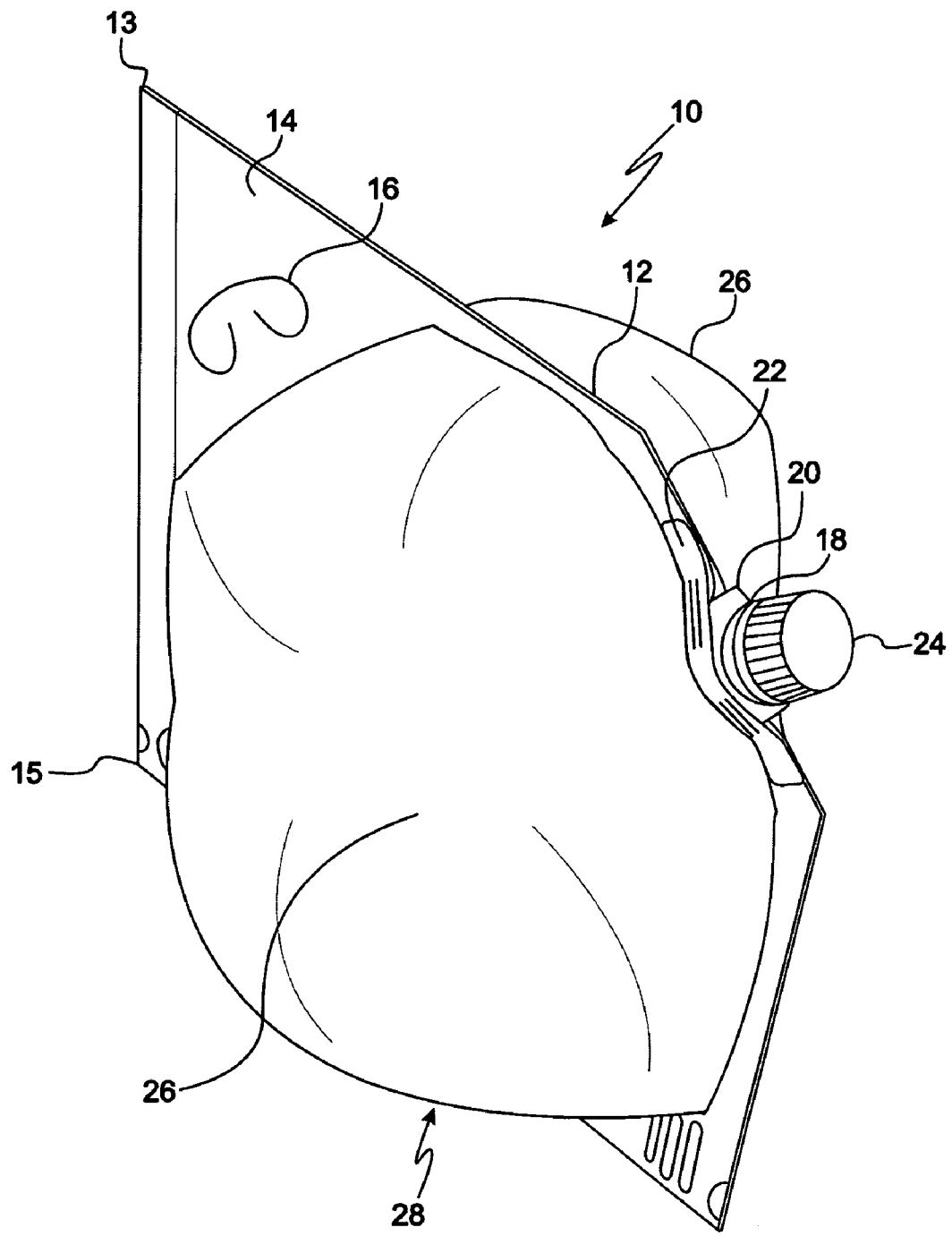
FIG. 2 is an upper perspective view of the bag of FIG. 1 filled with liquid.
Figure 3:
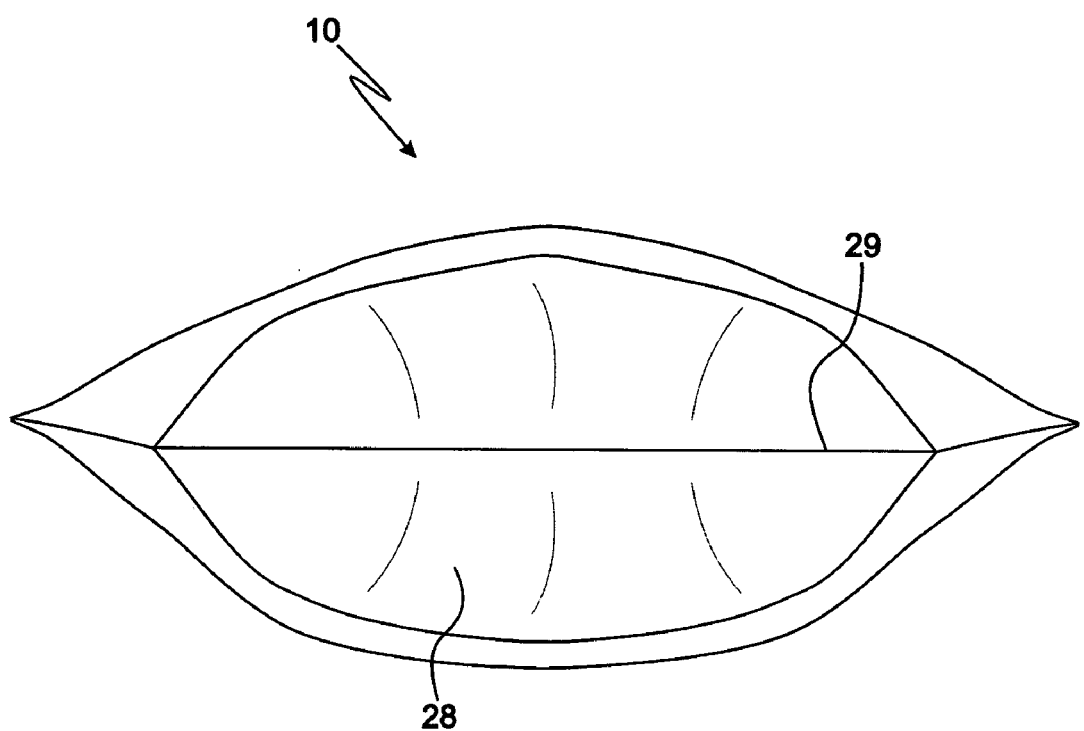
FIG. 3 is a bottom view of the filled bag of FIG. 2.

When bag 10 is at least partially filled with liquid, the sides bulge as shown at 26 in FIG. 2, but structures in the bottom of the bag create a substantially flat bottom 28 which allows the bag to stand upright. The structure is more apparent in FIG. 3, a bottom view showing a fold or pleat line 29 along the center of a substantially elliptical section 28 of the sheet material which is folded inside the empty bag but is pressed downward by the weight of liquid to form the flat bottom 28.

Figure 5:
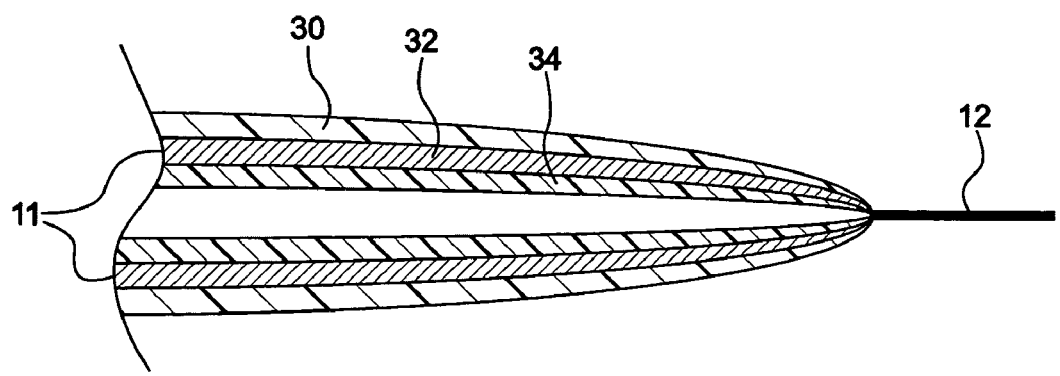
FIG. 5 is a partial sectional view of the bag of FIG. 1 showing the heat sealed edge.

FIG. 5 illustrates a partial sectional view, enlarged for clarity, of an edge of bag 10 as seen in FIG. 4. The laminated sheet material 11 forming the bag contains a central layer 32 of flexible, heat conductive material, in this case aluminum foil, an outer layer 30 of a durable polymer material such as polyethylene terephthalate (PET) and an inner layer 34 of a thermoplastic polymer such as a polyethylene. By a laminate or laminated material, it is meant that the several layers are fused, cemented or otherwise physically secured to each other to produce an integral sheet material whose layers are not easily separated. Such sheet materials are commercially available from companies such as Coated Product Sales of Dayville, Conn., URL www.coatedproduct.com, as well as many other sources. The material originally employed an outer 12 micron layer of PET, a 7 micron central layer of aluminum foil and a 100 micron inner layer of polyethylene. However, similar sheet materials could be manufactured from a variety of materials, using any strong, durable polymers which would withstand the temperatures of the heat treatments expected to be used with the bag and suitable flexible, heat conductive materials within.

Any suitable polymer material having the desired properties can be used for the outer layer, including polyesters, polypropylene and copolymers hereof, polyvinyl chloride and the like. The central layer need only be flexible and heat-conductive; while aluminum foil is suitable and commercially available, other metals including copper, silver and even gold could be used. In addition, organic materials meeting these functional requirements could be used, including various forms of heat conductive graphite. The inner layer should be food safe, at least where the contents of the bag are to be fed to animals or humans; flexible, thermoplastic enough to be heat sealed at the edges but capable of withstanding the heat treatment temperatures for sufficient times to ensure the integrity of the bags while under treatment. Many types of polyethylenes and copolymers hereof could be used, with the selections dependent upon economics and the temperature requirements of specific applications. As seen in FIG. 5, the inner layers 34 of the sheet material are fused together at the edges 12 to heat seal the bag at the edges and other portions as indicated in earlier figures.

Figure 6A:
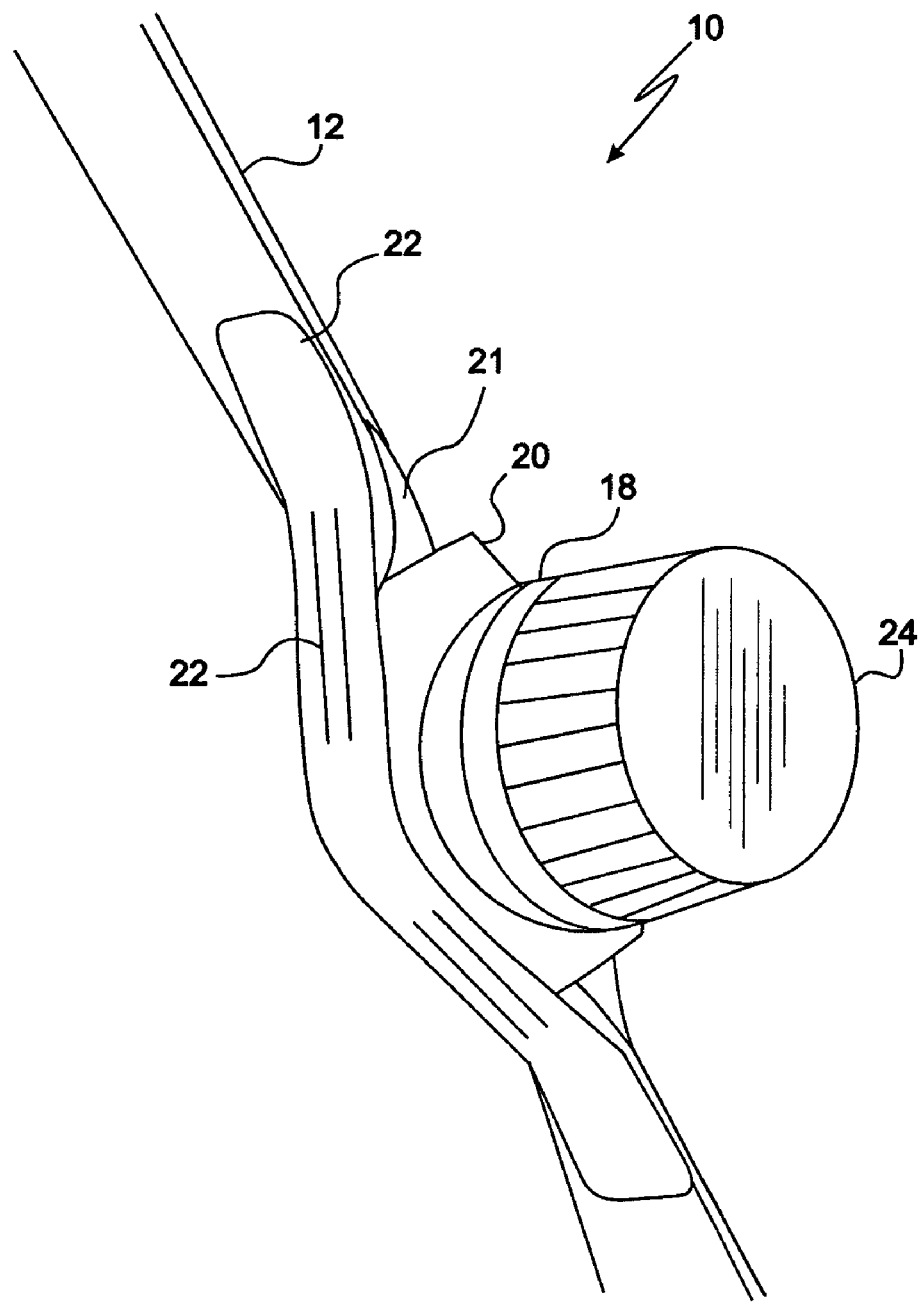
FIG. 6A is a detail view of the spout area of the bag of FIG. 1.
Figure 6B:
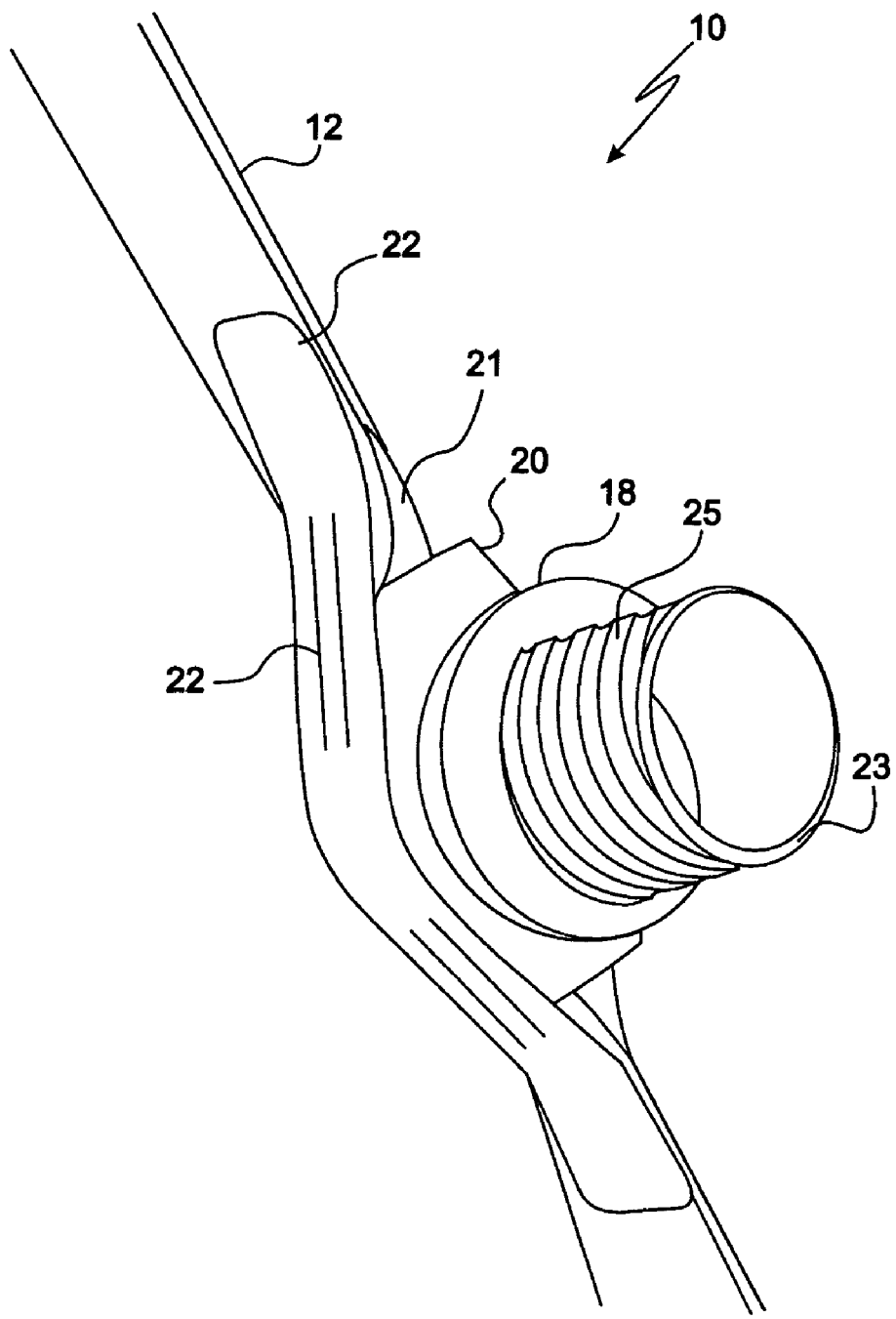
FIG. 6B is a detail view of the spout area of the bag of FIG. 1, with the screw cap removed.

FIG. 6A is a detailed view of the spout area of bag 10, showing how a portion 22 of sheet material 11 along edge 12 is heat sealed about a tapered portion 21 of the spout assembly and base 20 of the spout assembly to secure it into the upper corner of the bag. Screw cap 24 is shown as screwed onto threads 25 of spout 23 adjacent base 18 of the spout. FIG. 6B is the view of FIG. 6A with screw cap 24 removed to show threads 25 on spout 23 and base 18 of the spout. The screw cap or other fixtures generally screw onto the spout 23 so as to fit snugly. Spout 23 can be fabricated of any suitable material, but is preferably a polymeric material such as a polyethylene.

Figure 6C:
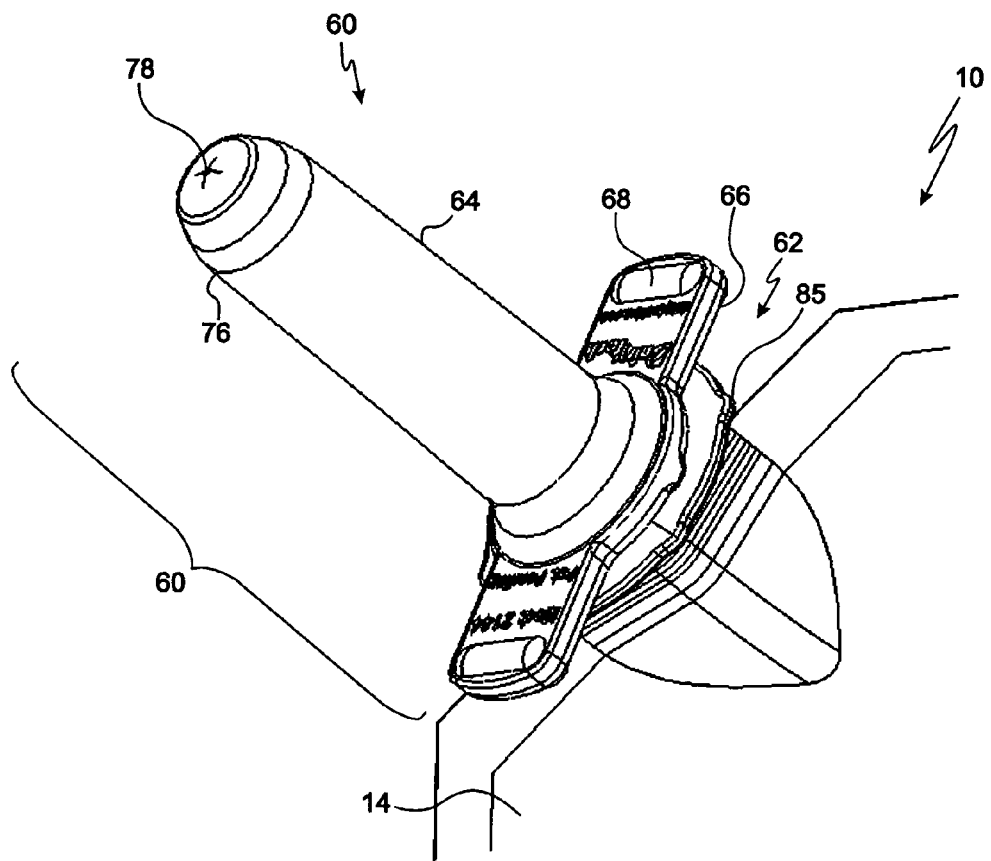
FIG. 6C is a detail view of the spout area of the bag of FIG. 1 with a nipple assembly attached for feeding young animals.
Figure 10:
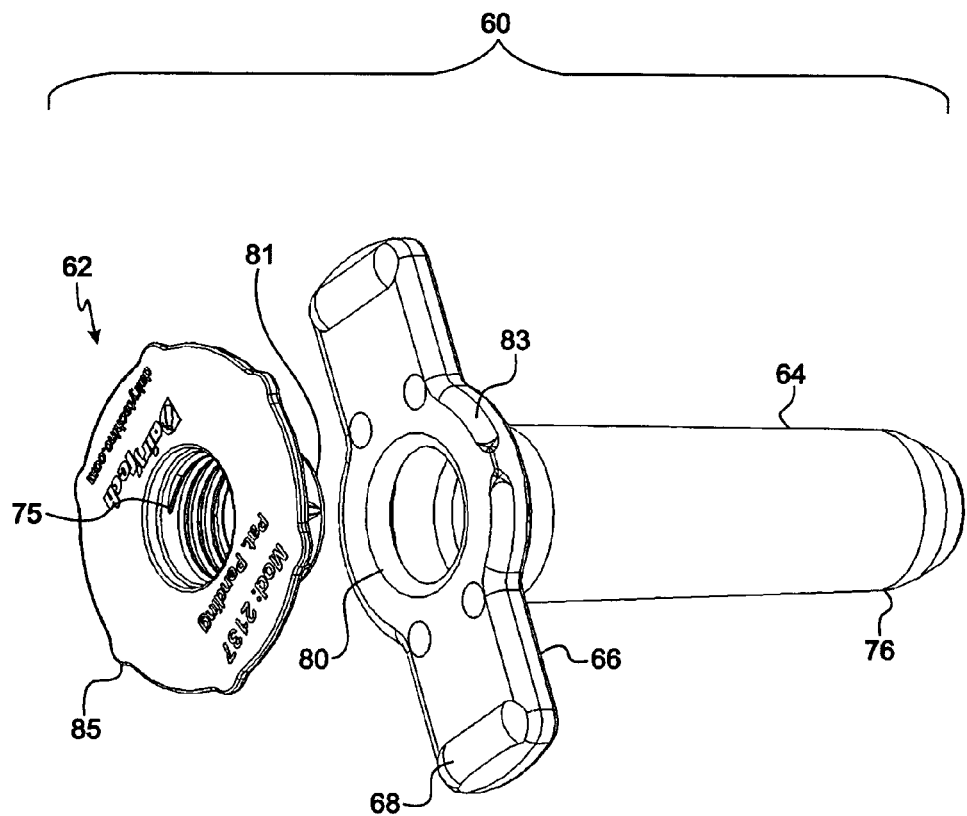
FIG. 10 is an exploded perspective view of a nipple assembly for use with the bag of FIG. 1.
Figure 11:
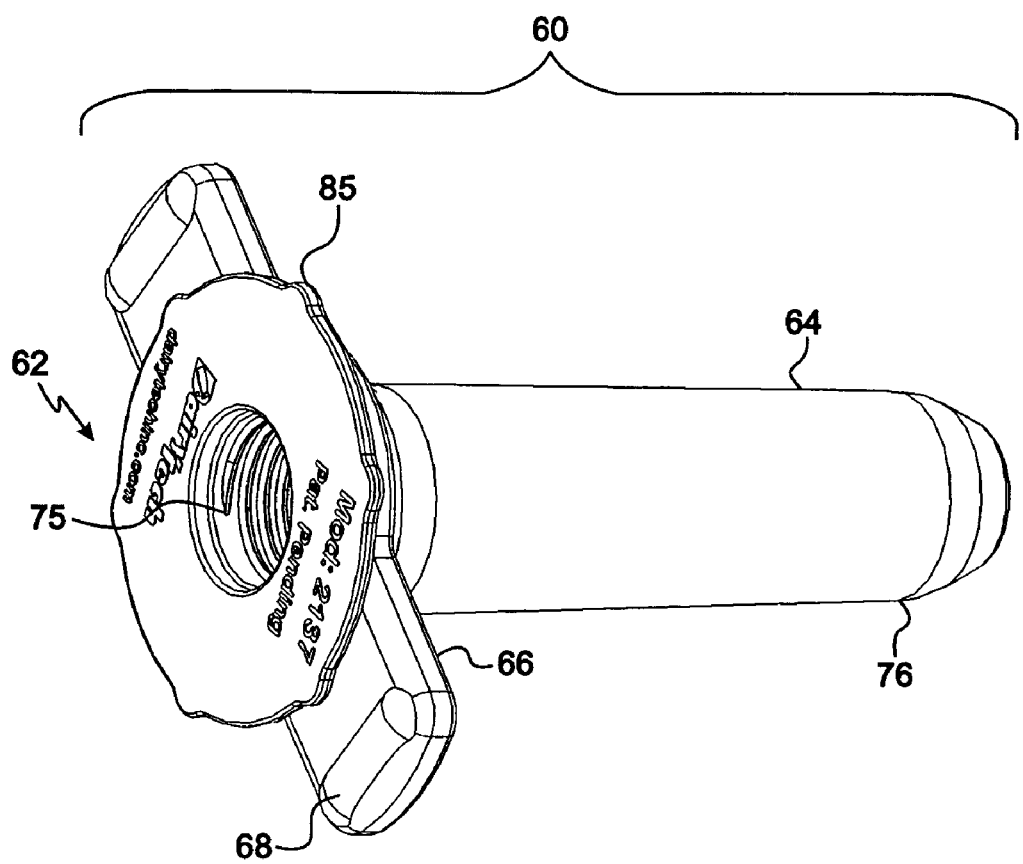
FIG. 11 is a perspective view of the nipple assembly of FIG. 10 with the components joined.
Figure 12:
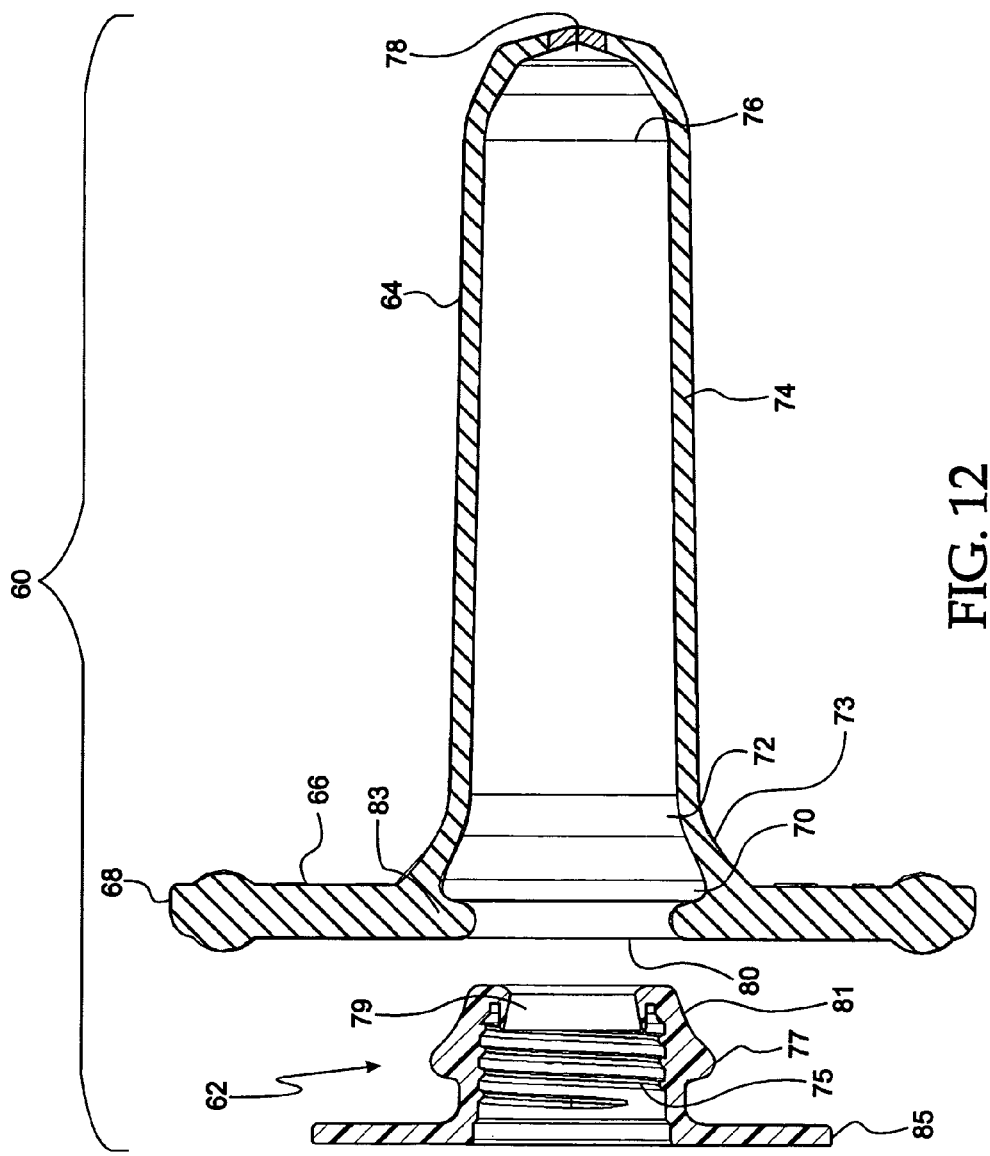
FIG. 12 is an exploded side sectional view of the nipple assembly of FIG. 11, including a nipple adapter.

FIG. 6C is a view similar to those of FIGS. 6A and 6B, with nipple assembly 60 (comprising a nipple 64 and nipple adapter 62) applied to the threaded spout 23 (not visible here). Nipple 64, described further below as illustrated in FIGS. 10-12, has a slightly tapered round trunk shaped for proper suckling purposes and constructed of a flexible elastomer such as rubberized PVC, GLS 2701, a Dynaflex® styrene-based thermoplastic elastomer manufactured by GLS Corporation (with Shore Hardness about A-65), Texin® 285 (a polyester-based thermoplastic polyurethane produced by Bayer Materials) or suitable natural or synthetic rubbers or the like. The distal (nursing) tip of nipple 64 begins to round off at circular transition line 76 and the center of the tip includes at least one aperture 78 for dispensing the product as the calf or other animal sucks the nipple 64. The nipple 64 is attached to a self-seating base or nipple adapter 62 which contains internal threads 75 (not seen here) to mount and properly seal with the spout threads 25 of spout 23. This combination is employed to provide a nipple which is flexible and durable enough to respond well to animal feeding and last for at least one feeding, while the stiffer nipple base 72, which is firmly applied to the sealing ledge 77 of nipple adapter 62, which is in turn screwed onto the spout 23 of bag 10, ensures that the nipple will be held firmly in place. More details re the nipple assembly are provided in the discussion of FIGS. 10-12 and in the copending application cited below.

Figure 7:
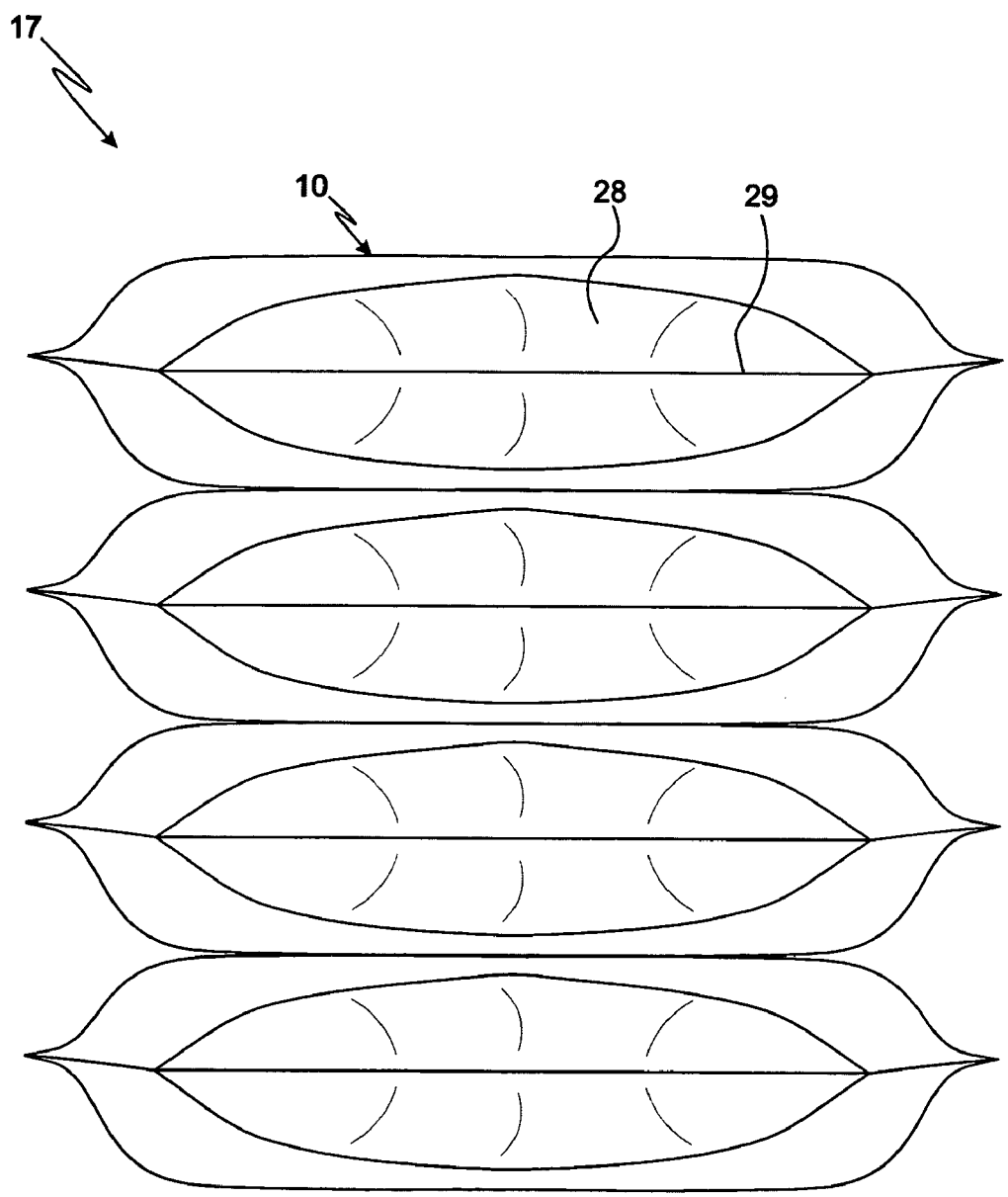
FIG. 7 is a side view of three bags filled as in FIG. 2, stacked atop each other for storage.

FIG. 7 shows a stack 17 of four bags 10 filled with liquid and stacked atop each other on their sides, with all facing in the same direction. The flexibility of the bag material and the weight of their contents causes their sides to flatten against each other when stacked, providing a convenient method of storing a number of bags in minimum space. The bags can be stacked with their bottom surfaces 28 all on the same side of the stack as shown, or alternated, with the spouts and bottom surfaces of adjacent bags on the same side of the stack. The capacity of the bags can be any suitable amount, depending upon the products to be treated and dispensed. For feeding dairy products to animals, the capacity could be from about a half pint to about one gallon; for feeding colostrum to calves, for example, a capacity of about three quarts or one gallon should be appropriate.

Figure 8A:
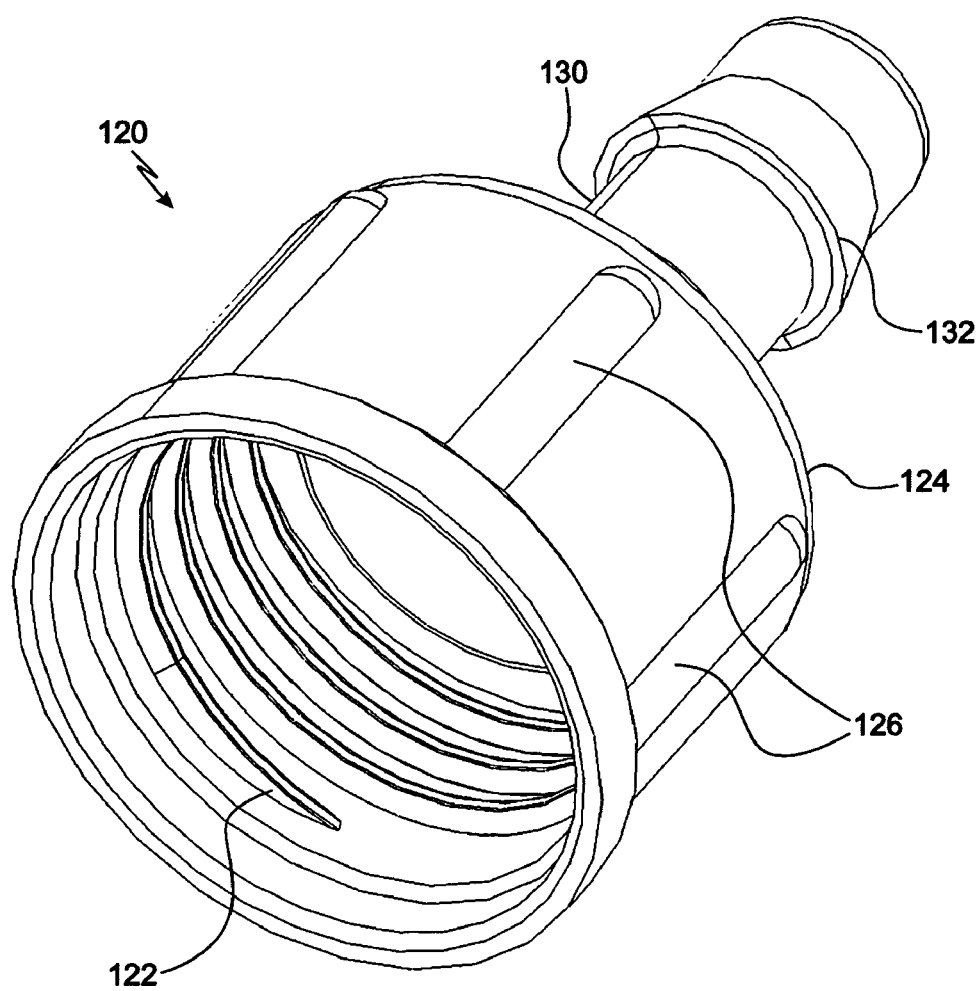
FIG. 8A is a perspective view of a barbed cap fitting for attachment of an esophageal feeder to the threaded spout of FIG. 1.
Figure 8B:
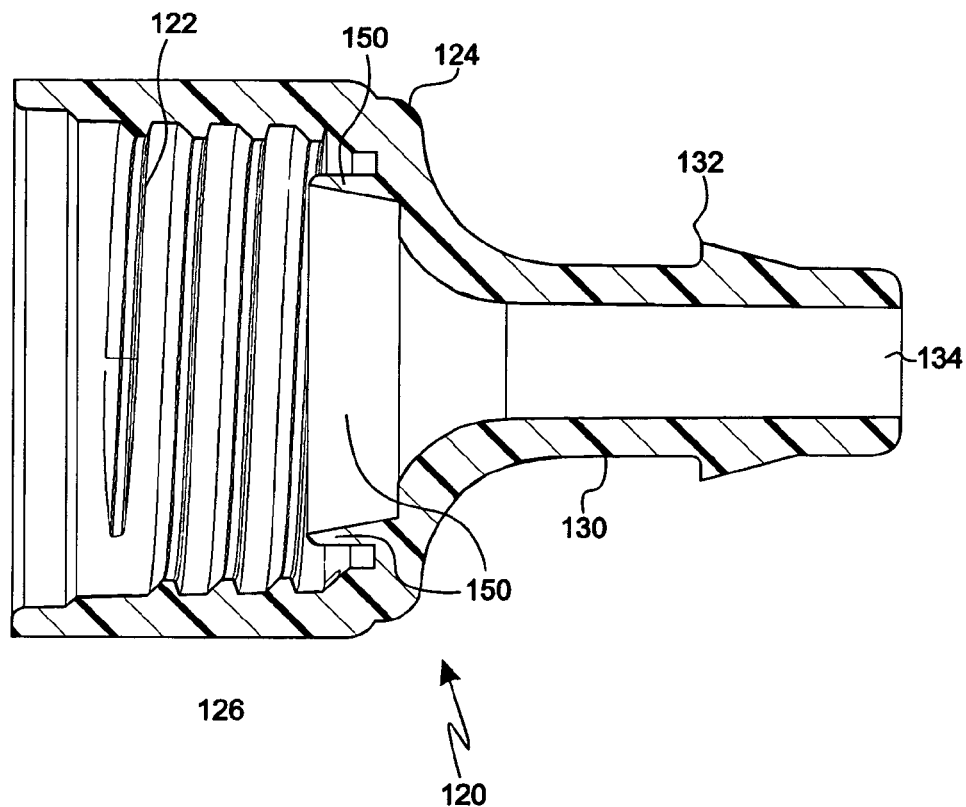
FIG. 8B is a sectional side view of the barb fitting of FIG. 8.

FIG. 8A is a perspective view of an alternative barbed cap fitting 120 designed to screw onto spout 23 of the bag via internal threads 122 within a base 124 having raised ridges 126 to assist the operator in gripping and installing the fitting. The fitting includes a neck 130 ending at the barb fitting shoulders 132. This fitting is designed to accommodate esophageal feeders, shown and described below. FIG. 8B is a sectional view of the fitting 120 of FIG. 8A showing its interior structure, including threads 122 and an integrated seal 150 designed to prevent liquids from escaping around the threads. Seal 150 is formed as a tapered cylindrical component inside threads 122 so that it enters the inside neck of spout 23 when fitting 120 is screwed hereon. This type of fitting is a preferred version because it minimizes leakage. When the fitting is screwed onto bag 10 and connected to a feeding device via the barb fitting, the liquid will flow through flow-way 134. This fitting can be made of hard rubbers or plastics such as polypropylene or polyethylenes.

Figure 9:
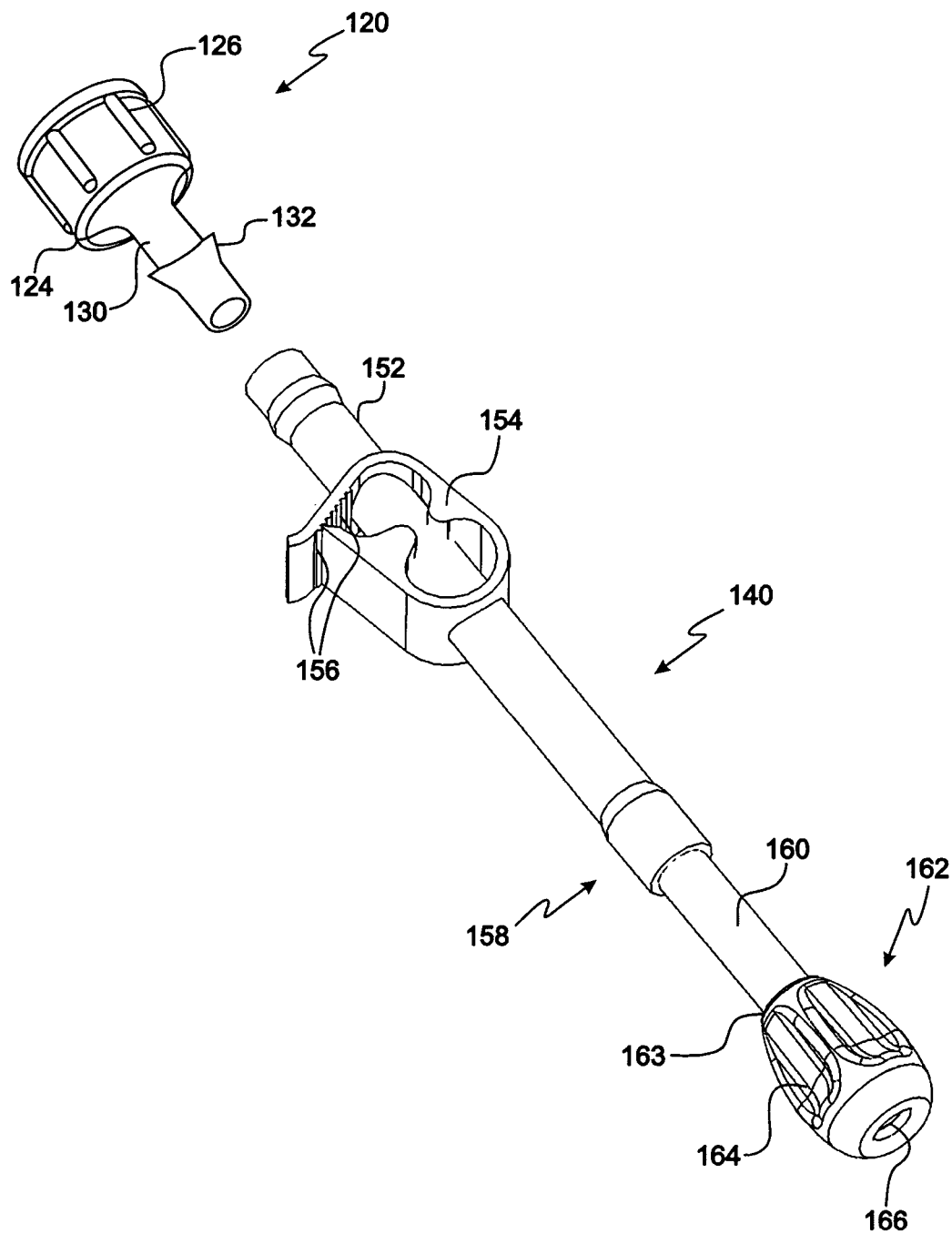
FIG. 9 is an exploded perspective view of the barbed cap fitting of FIGS. 8A/B, in position for attachment to an esophageal feeder.

FIG. 9 is an exploded perspective view of the threaded barb fitting 120 of FIGS. 8A and 8B and an esophageal feeder 140 ready to be attached to the barb end 132 of the fitting 120 for application to a filled bag 10 (not shown here). This "e-feeder" includes flexible tubing 152 of rubber, PVC or other suitable material such as polyurethane or Tygon®, a vinyl polymer, having suitable durometer readings and clarity. Clear PVC materials having Shore Hardness figures of A-65 or A-67 have been found suitable. Tubing clamp 154 is installed for flow control. Adjustment of clamp 154 by using ridges 156 permits variable settings to adjust the flow of product through the tube 152. Flexible tubing 152 is joined to a section of semi-rigid tubing 160 (made of, e.g., rigid PVC or polycarbonates) at a junction 158. An esophageal guide bulb 162 (also made of rigid PVC or polycarbonate) is attached to semi-rigid tubing 160 via a molded joint 163. The guide bulb 162 features depressions 164 to aid in product manufacture as well as sliding ease within an animal's esophagus and an open end 166 to direct the flow of product into the esophagus of the animal being fed. The esophageal feeder described above can also be used with the guide bulb being inserted directly into the stomach of an animal that is too young or too weak to nurse on its own. A strictly oral rendition of this method employs the bag 10 with the nipple assembly 60 attached, from which the calf or other animal can nurse through the nipple at will.

FIGS. 10, 11 and 12 illustrate the components of a nipple assembly 60, including nipple 64 and a nipple adapter 62 with internal threads 75 for attachment to the threaded spout 23 of a container 10. Nipple adapter 62 can be made of a harder rubber or a suitable synthetic polymer such as ABS (acrylonitrile-butadiene-styrene), filled or unfilled. Nipple 64 has a round, slightly tapered shaft with a wall 74 of flexible rubber or other suitable polymer (as described above), a rounded tip beginning at transition line 76 and at least one aperture 78 at the tip for dispensing the liquid. The aperture 78 can be cut into the molded nipple by cutting at least one single, crossed or crescent-shaped slit with a knife or similar tool to facilitate liquid flow requirements for various liquid products. The nipple wall 74 has a thickened transition 73 from the sealing area 72 and at least one sealing recess 70 to mate with projecting sealing edge 77 of the barb fitting end 81 of nipple adapter 62.

The nipple portion 64 of nipple assembly 60 includes an integral pair of handles 66, attached to a thickened structural base 83, with raised thumb grip ridges 68 on each side for the operator's use in forcing the beveled interior portion 80 of the nipple base 72 over the barb fitting 81 and sealing ledge 77 of adapter 62 to ensure a tight, secure attachment. Nipple adapter 62 has internal threads 75 designed to screw onto the threads 25 of spout 23. Special equipment can be used in mounting the nipple 64 on the nipple adapter 62, as described in Applicant's co-pending application RHD-5 for "Nipple Assembly," which application is incorporated herein by reference in its entirety.

The special mounting tools disclosed in Applicant's copending application RHD-5 can be used by mechanically securing the nipple adapter flange 85 thereto while the nipple 64 is applied to the barb fitting portion 81 of nipple adapter 62. FIG. 12 shows the interior structure of nipple adapter 62, including threads 75 and integral seal 79, designed to prevent liquids from escaping around the threads, as described above for seal 150 of barb fitting 120.

To assemble a fresh bag of colostrum, milk or other dairy product, the operator first secures the nipple 64 to the nipple adapter 62 using the mounting tool provided, combining the nipple 64 and nipple adapter 62 as shown in FIG. 11. He then removes the screw cap 24 and screws the nipple assembly 60 onto spout threads 25. This configuration allows a liquid-tight, secure connection of the nipple assembly to the bag, and easy cleaning or recycling of the nipples after use. The entire nipple is then placed into the mouth of the calf for feeding as the bag is inverted to allow the contents to empty. In a like manner, if esophageal feeding is required, the esophageal feeder assembly 140 of FIG. 9 is threaded onto the spout 23 using a threaded barb fitting 120 once cap 24 has been removed from the bag. Clamp 154 is closed while the bulb 162 is guided into the esophagus of the animal. The bag is then inverted, holding it by upper and lower handles 16, and clamp 154 is opened enough to allow adequate flow of liquid from the bag to accomplish feeding the animal.

The qualities of the embodiments disclosed above are further illustrated by the following working examples.

EXAMPLES

Initial tests have demonstrated that the core temperatures of fluid products contained in bags of the types disclosed above are able to reach the desired temperatures using the preferred sheet materials for forming the bags. Other sheet materials such as polyethylene bags, polypropylene jugs, glass containers and a variety of other plastic material containers were found not to permit adequate heat exchange. It is important to maintain minimum as well as maximum temperatures during these processes to protect the delicate protein molecules of dairy products while still disabling pathogenic microbes. Research with the aluminum foil-polymer laminated sheet materials disclosed above has shown that they can be used to produce bags meeting the requirements of heat treatment processes such as the pasteurization of small batches of dairy products.

Clearly, numerous modifications and variations of the disclosed embodiments are possible in light of the above teachings. It is therefore to be understood that within the scope of the appended claims the invention may be practiced otherwise than as specifically described herein for preferred embodiments.

I claim:

1. A kit comprising:
    a flexible, collapsible bag for containing, storing, dispensing and heat treating a liquid or slurry, said bag being formed from a heat conductive laminated sheet material having a central layer of aluminum foil, a layer of polyethylene used for the inner surface of said bag and for thermally bonding the edges thereof to form a liquid-tight bag, and an outer layer of polyethylene terephthalate (PET) to provide a durable outer surface, the edges of said bag being formed by thermal bonding, with a round spout thermally bonded into the upper portion of said bag and a cut-out handle residing in the heat conductive laminated sheet material, wherein said spout is a round tube comprising external threads adapted to receive a screw cap or a female-threaded dispensing fixture for dispensing the liquid;
    at least one nipple assembly comprising a feeding nipple and a nipple adapter adapted to fit the threaded dispensing spout; and
    at least one esophageal feeding tube for directly feeding young animals, also adapted to fit the threaded dispensing spout and comprising a barbed fitting and a flexible tube of non-toxic material of suitable length and diameter for oral or esophageal insertion with young animals.

2. The kit of claim 1 wherein said nipple assembly comprises a rigid fastener for liquid-tight attachment to said spout and a flexible, tubular section of non-toxic material of suitable length and diameter for suckling by young animals, said tubular section being closed at the end with a rounded portion containing at least one orifice therein for dispensing liquid.

* * * * *